(12) United States Patent
Aizik et al.

(10) Patent No.: US 12,233,939 B2
(45) Date of Patent: Feb. 25, 2025

(54) VEHICLE BODY IN WHITE AND METHOD FOR ITS MANUFACTURING

(71) Applicants: PLASAN SASA LTD., Kbiggutz Sasa (IL); Sarit Aizik, Or Yehuda (IL)

(72) Inventors: Felix Aizik, Kibbutz Sasa (IL); Nir Kahn, Nahariya (IL)

(73) Assignee: PLASAN SASA LTD., Kibbutz Sasa (IL)

( * ) Notice: Subject to any disclaimer, the term of this patent is extended or adjusted under 35 U.S.C. 154(b) by 355 days.

(21) Appl. No.: 17/623,022

(22) PCT Filed: Jul. 4, 2019

(86) PCT No.: PCT/IL2019/050747
§ 371 (c)(1),
(2) Date: Dec. 27, 2021

(87) PCT Pub. No.: WO2021/001813
PCT Pub. Date: Jan. 7, 2021

(65) Prior Publication Data
US 2022/0266913 A1       Aug. 25, 2022

(51) Int. Cl.
| | |
|---|---|
| *B62D 23/00* | (2006.01) |
| *B62D 21/02* | (2006.01) |
| *B62D 27/02* | (2006.01) |
| *B62D 29/04* | (2006.01) |

(52) U.S. Cl.
CPC ........... *B62D 23/005* (2013.01); *B62D 21/02* (2013.01); *B62D 27/023* (2013.01); *B62D 27/026* (2013.01); *B62D 29/041* (2013.01)

(58) Field of Classification Search
CPC .... B62D 23/005; B62D 21/02; B62D 27/023; B62D 27/026; B62D 29/041; B62D 25/02; B62D 29/04; B62D 27/02; B62D 65/06; B62D 29/043; B29C 45/14467; B29C 45/14311; B29C 45/1418; B29C 45/14622; B29K 2705/00; B29L 2031/30; B60J 5/04
USPC ...................................................... 296/181.1
See application file for complete search history.

(56) References Cited

U.S. PATENT DOCUMENTS

| | | | |
|---|---|---|---|
| 2,018,539 A | 10/1935 | James | |
| 2,923,542 A | 2/1960 | Clark et al. | |
| 3,787,130 A | 1/1974 | Hemmings et al. | |
| 4,355,844 A | 10/1982 | Fantini | |
| 5,882,064 A * | 3/1999 | Emmons | B62D 23/00 296/193.04 |

(Continued)

FOREIGN PATENT DOCUMENTS

| | | | |
|---|---|---|---|
| DE | 4423642 C1 * | 10/1995 | ......... B29C 65/5042 |
| DE | 10032556 A1 | 1/2002 | |

(Continued)

*Primary Examiner* — Pinel E Romain
(74) *Attorney, Agent, or Firm* — Dorsey & Whitney LLP

(57) ABSTRACT

A vehicle BIW sub-assembly comprising two or more structural members each having at least one engaging portion. The engaging portions of at least two of the structural members being connected to each other by a node unit formed of two or more shell members assembled with each other. The node unit having at least two designated sockets, each snugly receiving one engaging portion of one of the structural members, wherein at least one of said designated sockets is an interior socket formed between the two or more shell members.

15 Claims, 8 Drawing Sheets

(56) References Cited

U.S. PATENT DOCUMENTS

| | | | | |
|---|---|---|---|---|
| 6,619,715 | B2* | 9/2003 | Rackham | B62D 27/026 |
| | | | | 296/203.02 |
| 8,641,133 | B1* | 2/2014 | Scaringe | B62D 29/008 |
| | | | | 296/193.03 |
| 9,731,773 | B2 | 8/2017 | Gami et al. | |
| 10,081,395 | B2* | 9/2018 | Ritschel | B62D 27/026 |
| 10,618,563 | B2* | 4/2020 | Terada | B62D 21/02 |
| 2012/0319981 | A1 | 12/2012 | Habas | |
| 2016/0297479 | A1 | 10/2016 | Ritschel et al. | |
| 2017/0259856 | A1 | 9/2017 | An et al. | |

FOREIGN PATENT DOCUMENTS

| | | |
|---|---|---|
| DE | 102013206238 A1 | 10/2014 |
| DE | 102013209102 A1 | 11/2014 |
| EP | 2872377 A1 | 5/2015 |
| JP | 2002068013 A | 3/2002 |
| JP | 2010235014 A | 10/2010 |
| WO | 9962752 A1 | 12/1999 |
| WO | 2012062391 A1 | 5/2012 |

\* cited by examiner

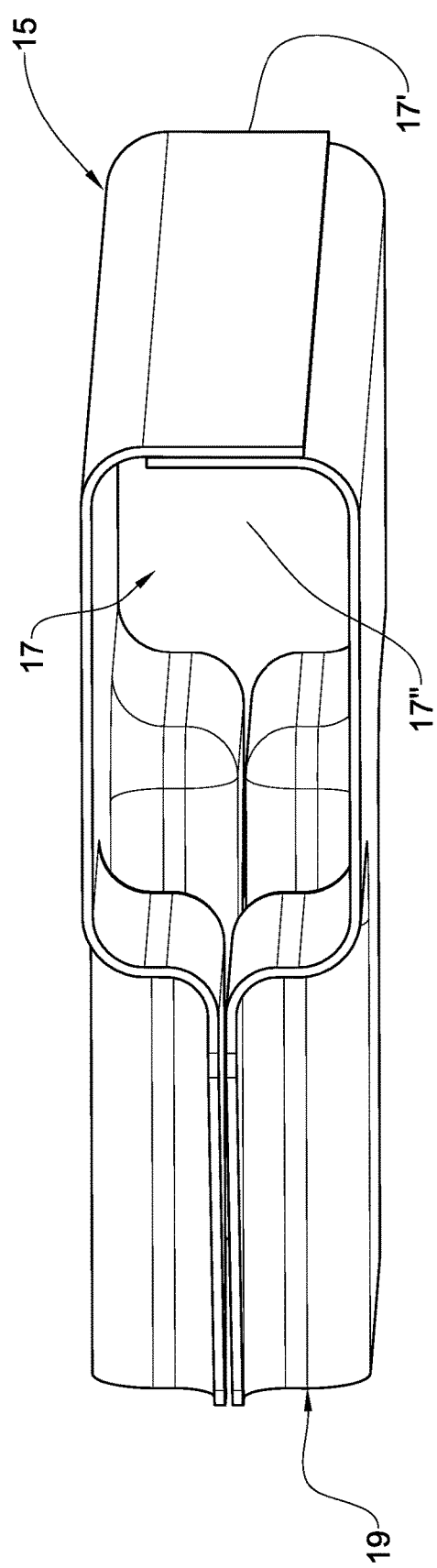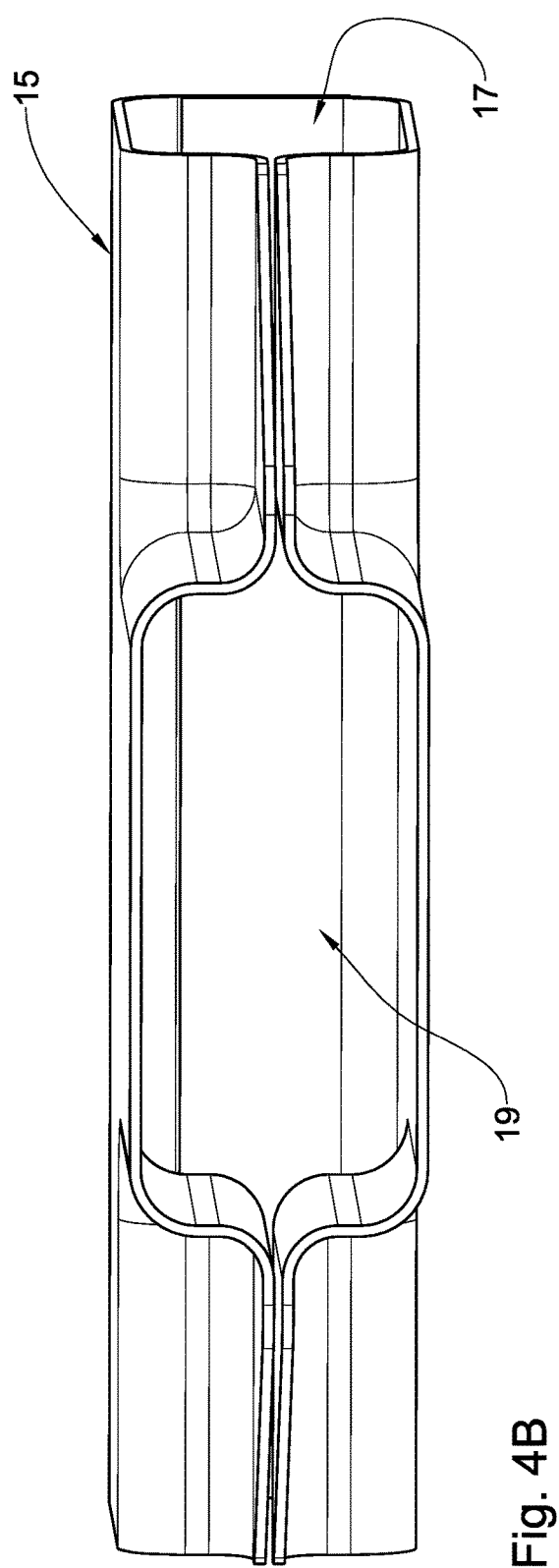
Fig. 4A
Fig. 4B

VEHICLE BODY IN WHITE AND METHOD FOR ITS MANUFACTURING

TECHNOLOGICAL FIELD

The present disclosure concerns a vehicle body in white (BIW) and method for its manufacture, particularly suitable for mass production.

BACKGROUND

It is known the art of automobile manufacturing that Body in White (BIW) is an assembly of a vehicle body's components permanently and fixedly joined together and constituting a frame structure of the vehicle's body configured to support its remaining components such as the engine, chassis sub-assemblies, trim (glass, doors with their locks/handles, seats, upholstery, electronics, etc.). The stage of manufacturing of the BIW in the entire process of manufacturing a vehicle thus precedes such manufacturing stages as painting and assembling the above remaining components.

Traditionally, structural members of BIWs are produced of metals and alloys and are permanently fixed to each other by such conventional techniques as welding, riveting, clinching, bonding, laser brazing, etc.

High volume manufacturing in the automotive industry requires automation in producing and processing the composite structural members, e.g., by pultrusion.

Pultrusion technology for producing composite structural members, e.g. composite beams/pillars, mainly consists of the forming of impregnated fibres in a die (impregnation is performed in an open bath or by injection). The die is also responsible for the curing of the resin by means of a heating system (frequently by heat resistors). Once the composite beams has been pulled, they can be cut into the desired length. Such structural members have improved qualities over conventional structural members made of steel.

GENERAL DESCRIPTION

The present disclosure thus refers to a vehicle sub-assembly configured to constitute a part of a BIW, comprising two or more structural members connected to each other by a node unit, at least one of the members being made of composite material.

Since composite materials have much lower weight than traditional materials from which BIWs are normally produced, their use in the automobile manufacturing industry is very attractive. The present disclosure is thus directed to provide a solution suitable for commercial use in the manufacturing of BIWs, allowing permanent fixation of structural members made of composite materials to each other and to structural members made of non-composite materials such as traditional metals and/or alloys.

More particularly, according to one aspect of the presently disclosed subject matter, there is provided a vehicle having a BIW comprising two or more structural members connected to each other by a node unit assembled of at least two separate shell members fastened to each other to form a common integral body with two or more designated sockets, each of the structural members having at least one engaging portion snugly received within one of the designated sockets, at least one of the designated sockets being an interior socket formed between socket portions of at least two of the shell members such that a complete interior socket is formed only when the shell members are fastened to each other.

Alternatively or in addition to the above, one or more of the shell members can each be formed with its own socket configured for accommodating the engaging portion of one of the structural members, this own socket existing independently of the assembly of the shell members with each other.

A cross section of at least one of the designated sockets of the node unit can correspond to a cross section of the respective engaging portion of the structural member snugly received therein.

Each pair of the shell members of the node unit can be formed with auxiliary flanges having mating configurations, at which the shell members can be configured to be secured/fastened to each other, so that a contact area between the auxiliary flanges constitutes a majority of the total contact area of the shell members of the pair. The securing of the auxiliary flanges to one another can be performed by any conventional techniques such as welding, riveting, clinching, bonding, laser brazing, gluing using a suitable adhesive, or any other known securing method, or a combination thereof. At least the auxiliary flanges of the shell members can be made of a sheet material, which can be a metal or a metal alloy. The auxiliary flanges can be further configured to facilitate applying pressure thereupon during forming of the shell members.

The entire node unit can be made of metal or alloy, such as aluminum, steel, magnesium, etc., which can be in the form a pressed sheet material. Alternatively, at least one of the shell members of the node unit can be made of a composite material.

The node unit can further comprise fasteners configured to secure the shell members of the node unit to each other. According to a particular example, such fasteners can extend through the auxiliary flanges of the shell members.

The node unit can be configured to be connected to another node unit so as to create a complex node structure.

The separate shell members can be formed as a unitary member comprising two or more shell portions connected along one or more folding lines of the node unit. Alternatively, the one or more shell portions can be integral with one another.

At least one of the shell members can be deformable between an original state which it has prior to being secured to another shell member and deformed state which it has at least after being secured to another shell member to form the at least one designated socket configured to snugly receive a portion of the structural member.

At least one of the shell members can be attached to or constitute a part of a portion of a vehicle which is other than its BIW, such as a wall of a vehicle, e.g., a sidewall, a floor wall, a roof wall, a bulkhead wall, etc. The wall can be a sheet metal wall, e.g. it may be made of a sheeted aluminum alloy, sheeted steel alloy, or sheeted magnesium alloy.

Such shell members allow the vehicle BIW to be assembled in layers together with at least some of the vehicle walls. For example, the first layer can include a wall attached with, or integral with, a first shell member, the second layer can include the structural members, while the third layer can include a second shell member which constitutes a mate for the first shell member.

At least the engaging portion of at least one of the structural members of the vehicle, which is received within the interior socket of the node unit, can be made of composite material.

The shell members can be fastened to each other over that engaging portion. The shell members can be configured to be pressed at least against one engaging portion, so that the corresponding interior socket is rendered a shape conforming to the shape of this engaging portion.

The engaging portion of at least one of the structural members can constitute a middle engaging portion disposed between side portions of the structural member, and the corresponding socket can constitute an embracing socket configured to receive therein the middle engaging portion so that the side portions of the structural member protrude therefrom. The embracing socket can be the interior socket.

Two or more designated sockets of the node unit can be interior sockets, and the shell members can be fastened to each other over the corresponding two or more engaging portions.

One, two or more of the structural members can be made of composite material, e.g., thermosetting resins combined with glass or carbon fibers. Composite structural members have good mechanical properties and high corrosion resistance by maintaining low weight, when compared to conventional structural members which are made of steel.

According to an example, at least some of these structural members, being made of composite material, are manufactured in a process of pultrusion.

The structural members can be beams/pillars of the vehicle BIW.

The node unit can have greater resiliency to stress than the structural members fixedly connected thereby.

The engaging portion of at least one of the structural members can be formed with a designated depression configured to receive therein a protruding engaging inner portion of the corresponding shell member.

The engaging portion of at least one of the structural members can constitute a middle engaging portion disposed between side portions of the structural member, and the corresponding socket constitutes an embracing socket being configured to receive therein the middle engaging portion so that the side portions of the structural member protrude therefrom.

The embracing socket can be an interior socket.

According to another aspect of the disclosure, there is provided a vehicle BIW sub-assembly comprising two or more structural members having two or more respective engaging portions connected to each other by a node unit having any of the features described above.

According to another aspect of the disclosure, there is provided a node unit having any of the features described above and configured to be integrated in a vehicle BIW sub-assembly comprising two or more structural members whose two or more engaging portions are to be connected to each other by the node unit.

The term BIW as used herein denotes a structural frame of a vehicle or a portion thereof, designed to bear loads. This term can refer for example to a vehicle spaceframe, a vehicle chassis, a vehicle frame, a vehicle monocoque, a vehicle unibody, a vehicle body on frame, etc.

The term structural member as used herein denotes any structure or assembly configured to constitute a portion of a BIW. A structural member can be a unitary body, e.g. a 3D or 2D truss, a support beam, a sheet panel, or be an assembly comprising two or more unitary bodies.

According to yet another aspect of the present disclosure there is provided a method for manufacturing a vehicle BIW sub-assembly; the method comprising the steps of:
  (a) providing two or more structural members each having at least one engaging portion;
  (b) providing at least two separate shell members, which when assembled with each other form a node unit with two or more designated sockets each configured to snugly receive one of the engaging portions of the two or more structural members, at least one of the designated sockets being an interior socket formed between socket portions of the at least two shell members;
  (c) assembling the shell members and the structural members by ensuring that the engaging portions of the structural members are snugly received within the designated sockets;
  (d) the assembling of step (c) comprising fastening the shell members to each other over the engaging portion of at least one of the structural members to as to form the interior socket and fixedly secure this, fasten-over engaging portion within the interior socket of the node unit.

Optionally, the above method can further comprise an intermediate step (e) of snugly inserting at least one of the engaging portion of the structural members other than the fasten-over engaging portion into to a designated socket other than said interior designated socket, and fastening this other, non-fasten-over engaging portion therewithin. The intermediate step (e) can constitute a part of the ensuring in step (c) and it can be performed simultaneously with or prior to step (a).

The two structural members can have longitudinal axes and can be fixedly secured to each other so that their longitudinal axes form a non-zero angle with respect to each other.

The fastening of the two shell members node unit to each other to form the node unit can be performed using any suitable fastening techniques such as welding, riveting, clinching, screwing/bolting, bonding, laser brazing fastener, gluing, etc., and can include applying force to the shell member including pressing, deforming or the like.

The above aspects of the present disclosure, and particularly, the specific manner in which at least two structural members of a BIW are connected according to these aspects, can be highly effective when at least one engaging portion of at least one of the members is made of composite material. They can also essentially facilitate mass production of such sub-assemblies and their incorporation into a traditional car production line or on a slightly modified car production line, in an efficient and cost effective manner.

The above general description has been provided so that the nature of the disclosed subject matter can be generally understood without being limited to specific embodiments and examples. A more specific description is provided below with reference the following Embodiments and to Detailed Description of examples shown in the drawings presented after the list of embodiments:

1. A vehicle with a BIW comprising two or more structural members having two or more respective engaging portions connected to each other by a node unitnode unit formed of two or more shell members assembled with each other, the node unit having at least two designated sockets, each snugly receiving one engaging portion of one of the structural members, wherein at least one of said designated sockets is an interior socket formed between the two or more shell members.

2. The vehicle according to Embodiment 1, wherein at least one of the shell members is attached to a wall of the vehicle.

3. The vehicle according to Embodiment 1 or Embodiment 2, wherein at least one of the shell members constitutes a part of a wall of the vehicle.

4. The vehicle according to Embodiment 1, Embodiment 2 or Embodiment 3, wherein said wall of the vehicle is a sheet metal wall.

5. The vehicle according to any one of Embodiments 2 to 4, wherein said wall of the vehicle is made of at least one of aluminum alloy, steel alloy, or magnesium alloy.

6. The vehicle according to any one of the preceding embodiments, wherein at least the engaging portion received within said interior socket is made of a composite material.

7. The vehicle according to Embodiment 6, wherein the shell members are fastened to each other over the engaging portion made of a composite material.

8. The vehicle according to any one of the preceding embodiments, wherein two or more of the engaging portions of the structural members are made of a composite material.

9. The vehicle according to any one of the preceding embodiments, wherein two or more of the designated sockets of the node unit are interior sockets defined between at least two of the shell members, and these shell members are fastened to each other over the respective engaging portions.

10. The vehicle according to any one of the preceding embodiments, wherein at least one of the structural members is made of a composite material.

11. The vehicle according to any one of the preceding embodiments, wherein at least two of the structural members are made of a composite material.

12. The vehicle according to any one of the preceding embodiments, wherein the structural members are beams or pillars of the vehicle BIW.

13. The vehicle according to any one of the preceding embodiments, wherein the shell members are made of a sheet material.

14. The vehicle according to any one of the preceding embodiments, wherein the shell members are made of a non-composite material.

15. The vehicle according to any one of the preceding embodiments, wherein the shell members are made of metal.

16. The vehicle according to any one of the preceding embodiments, wherein the shell members are configured to be pressed at least against one engaging portion of at least one of the structural members, so that the corresponding interior socket is rendered a shape conforming to the shape of this engaging portion.

17. The vehicle according to any one of the preceding embodiments, wherein the engaging portion of at least one of the structural members constitutes a middle engaging portion disposed between side portions of the structural member, and the corresponding socket constitutes an embracing socket receiving therein the middle engaging portion so that the side portions of the structural member protrude therefrom.

18. The vehicle according to Embodiment 17, wherein the embracing socket is the interior socket.

19. The vehicle according to any one of the preceding embodiments, wherein the two or more designated sockets are interior sockets formed between two or more of the shell members.

20. A vehicle BIW sub-assembly comprising two or more structural members each having at least one engaging portion; the engaging portions of at least two of the structural members being connected to each other by a node unit formed of two or more shell members assembled with each other, the node unit having at least two designated sockets, each snugly receiving one engaging portion of one of the structural members, wherein at least one of said designated sockets is an interior socket formed between the two or more shell members.

21. The vehicle BIW sub-assembly constituting a part of the vehicle according to Embodiment 20.

22. The vehicle BIW sub-assembly according to Embodiment 20 or 21, wherein at least the engaging portion received within said interior socket is made of a composite material.

23. The vehicle BIW sub-assembly according to any one of Embodiment 20 to 22, wherein the shell members are fastened to each other over the engaging portion snugly received within the interior socket.

24. The vehicle BIW sub-assembly according to any one of Embodiment 20 to 23, wherein the two or more of the engaging portions of the structural members are made of composite material.

25. The vehicle BIW sub-assembly according to Embodiment 24, wherein at least two of the designated sockets of the node unit are interior sockets formed between the shell members, and the shell members are fastened to each other over the engaging portions received within these interior sockets.

26. The vehicle BIW sub-assembly according to any one of embodiments 21 to 25, wherein at least one of the structural members is made of composite material.

27. The vehicle BIW sub-assembly according to any one of embodiments 21 to 26, wherein at least two of the structural members are made of composite material.

28. The vehicle BIW sub-assembly according to any one of embodiments 21 to 27, wherein the structural members are in the form of vehicle beams or pillars.

29. The vehicle BIW sub-assembly according to any one of embodiments 21 to 28, wherein the shell members are made of a sheet material.

30. The vehicle BIW sub-assembly according to any one of embodiments 21 to 29, wherein the shell members are made of a non-composite material.

31. The vehicle BIW sub-assembly according to any one of embodiments 21 to 30, wherein the shell members are made of metal.

32. The vehicle BIW sub-assembly according to any one of embodiments 21 to 31, wherein the shell members are configured to be pressed at least against the engaging portion, over which the shell members are configured to be fastened to each other, so that the corresponding interior socket is rendered a shape conforming to the shape of this engaging portion.

33. The vehicle BIW sub-assembly according to any one of embodiments 21 to 32, wherein the engaging portion of at least one of the structural members constitutes a middle engaging portion disposed between side portions of the structural member, and the corresponding socket constitutes an embracing socket being configured to receive therein the middle engaging portion so that the side portions of the structural member protrude therefrom.

34. The vehicle BIW sub-assembly according to 33, wherein the embracing socket is the interior socket.

35. The vehicle BIW sub-assembly according to any one of embodiments 21 to 34, wherein at least two of the designated sockets are interior sockets.

36. A node unit configured to be integrated in a vehicle BIW sub-assembly comprising two or more structural members whose two or more engaging portions are to be connected to each other by said node unit; said node unit being formed of two or more shell members assembled with each other, the node unit having at least two designated sockets each configured to snugly receive one engaging portion of one of the structural members, at least one of said designated sockets being an interior socket formed between at least two of the shell members, the shell members being configured to be fastened to each other over at least one of the engaging portions, to fixedly secure at least that engaging portion within the interior socket of the node unit.

37. The node unit according to Embodiment 36, wherein the shell members are made of a sheet material.

38. The node unit according to any one of Embodiment 36 or Embodiment 37, wherein the shell members are made of a non-composite material.

39. The node unit according to any one of Embodiment 36, Embodiment 37 or Embodiment 38, wherein the shell members are made of metal.

40. The node unit according to any one of embodiments 36 to 39, wherein the shell members are configured to be pressed at least against the engaging portion, over which the shell members are configured to be fastened to each other, so that the corresponding interior socket is rendered a shape conforming to the shape of this engaging portion.

41. The node unit according to any one of embodiments 36 to 40, wherein the engaging portion of at least one of the structural members constitutes a middle engaging portion disposed between side portions of the structural member, and the corresponding socket constitutes an embracing socket being configured to receive therein the middle engaging portion so that the side portions of the structural member protrude therefrom.

42. The node unit according to Embodiment 41, wherein the embracing socket is the interior socket.

43. The node unit according to any one of embodiments 36 to 42, wherein at least two of the designated sockets are interior sockets formed between at least two of the shell members.

44. The vehicle according to any one of Embodiments 1 to 19, or the BIW sub-assembly according to any one of Embodiments 20 to 35, or the node unit according to any one of embodiments 36 to 43, wherein the designated sockets have such mutual orientation that, when the engaging portions are received therewithin, they have a load bearing interface between them.

45. The vehicle or the sub-assembly or the node unit according to Embodiment 44, wherein the load bearing interface is a partition at least partially separating between the sockets.

46. The vehicle according to any one of Embodiments 1 to 19, 44 or 45, or the sub-assembly according to any one of Embodiments 20 to 35, or 44 or 45 or the node unit according to any one of embodiments 36 to 43, or 44 or 45, wherein the shell members are configured to be fastened to one another by an adhesive.

47. The vehicle according to any one of Embodiments 1 to 19 or 44 to 46, or the sub-assembly according to any one of Embodiments 20 to 35 or 44 to 46, or the node unit according to any one of embodiments 36 to 43 or 44 to 46, wherein at least two of the shell members constitute mating shell members and are formed with respective mating auxiliary flanges configured to engage each other when the two shell members are fastened to each other, each of the flanges extending between two of the designated sockets.

48. The vehicle or the sub-assembly or the node unit according to Embodiment 47, wherein when the at least two mating shell members are fastened to each other, a contact area of their auxiliary flanges constitutes a majority of the total contact area of these shell members.

49. The vehicle or the sub-assembly or the node unit according to Embodiment 47 or Embodiment 48, wherein said auxiliary flanges are configured to be fastened to one another by an adhesive thereby fastening the shell members associated therewith to each other.

50. A method for manufacturing a vehicle BIW sub-assembly; the method comprising the steps of:
(a) providing two or more structural members each having at least one engaging portion;
(b) providing at least two separate shell members, which when assembled with each other form a node unit with two or more designated sockets each configured to snugly receive one of the engaging portions of the two or more structural members, at least one of the designated sockets being an interior socket formed between socket portions of the at least two shell members;
(c) assembling the shell members and the structural members by ensuring that the engaging portions of the structural members are snugly received within the designated sockets;
(d) the assembling of step (c) comprising fastening the shell members to each other over the engaging portion of at least one of the structural members to as to form the interior socket and fixedly secure this, fasten-over engaging portion within the interior socket of the node unit.

51. The method according to Embodiment 50, optionally further comprising snugly inserting at least one of the a second engaging portion of the structural members other than the fasten-over engaging portion into to a second the a designated socket other than said interior designated socket, and fastening this other, non-fasten-over engaging portion therewithin.

52. The method according to Embodiment 50 or Embodiment 51, wherein said fastening of the two or more shell members is performed by an adhesive.

BRIEF DESCRIPTION OF THE DRAWINGS

In order to better understand the subject matter that is disclosed herein and to exemplify how it may be carried out in practice, embodiments will now be described, by way of non-limiting examples only, with reference to the accompanying drawings, in which:

FIG. 4A is a side perspective view of the node unit, whose shell members are shown in FIGS. 2 to 3B, in an assembled state;

FIG. 4*b* is a front perspective view of a node unit according to another example of the presently disclosed subject matter;

DETAILED DESCRIPTION OF EMBODIMENTS

Figure 1:
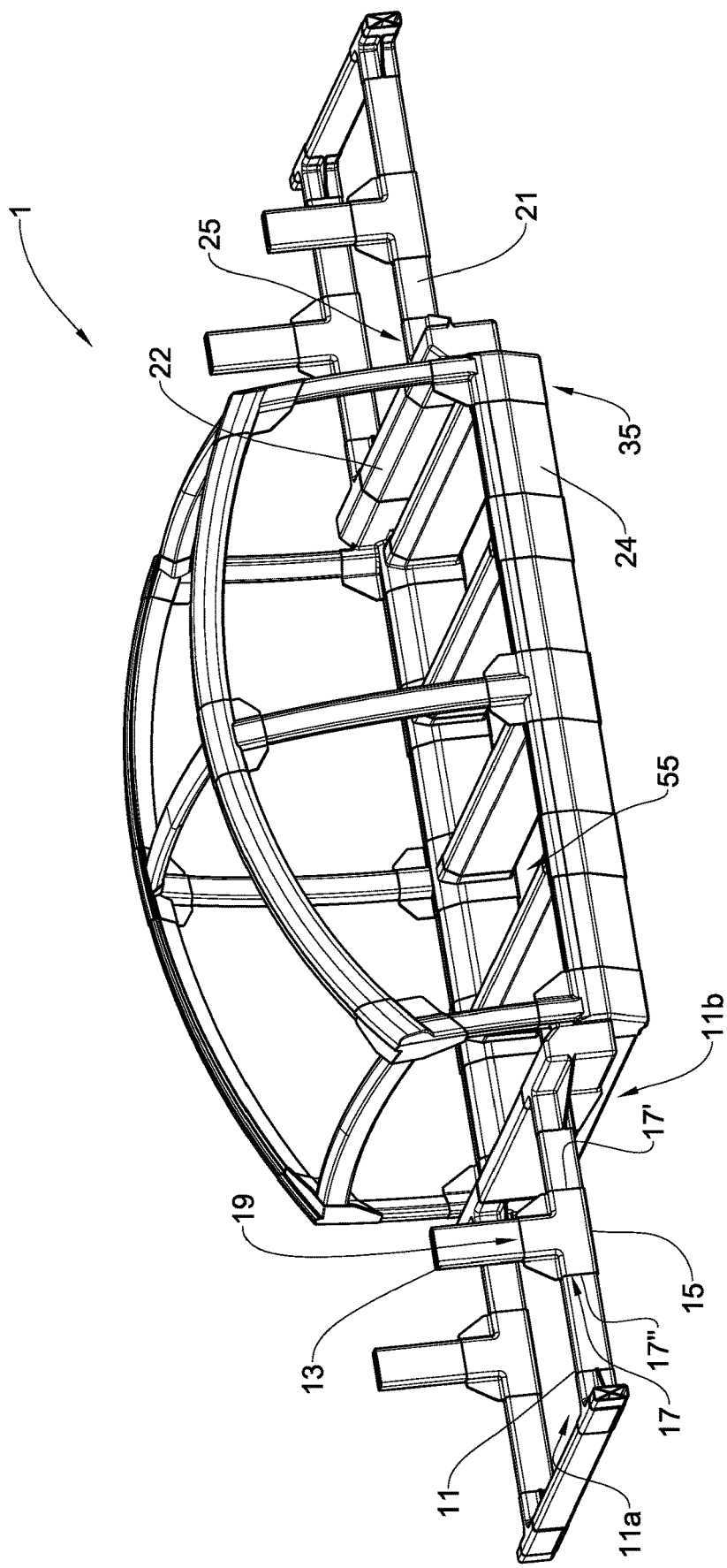
FIG. 1 is a front perspective view of one example of a BIW of a vehicle, where different node units according to the presently disclosed subject matter are used.

FIG. 1 illustrates a vehicle Body In White (BIW), which is a vehicle spaceframe structure 1 consisting of structural members in the form of beams connected to each other by node units at intersection/meeting areas. Each node unit has at least two designated sockets node unit, each configured to snugly receive therein a portion of a different beam, referred to herein as an engaging portion of the beam, so as to fixedly secure in place this engaging portion and thus the beam, and thereby adjoin the two different beams into a unified structure while maintaining their desired mutual orientation.

In the BIW shown in FIG. 1, there is a plurality of such beams with their engaging portions received in respective node units, of which for the purpose of brevity, only one node unit which is designated as 15, and only two beams which are designated as 11 and 13, will be referred to in the description below, whilst the description is fully applicable to all other node units and beams connected thereby.

Figure 2:
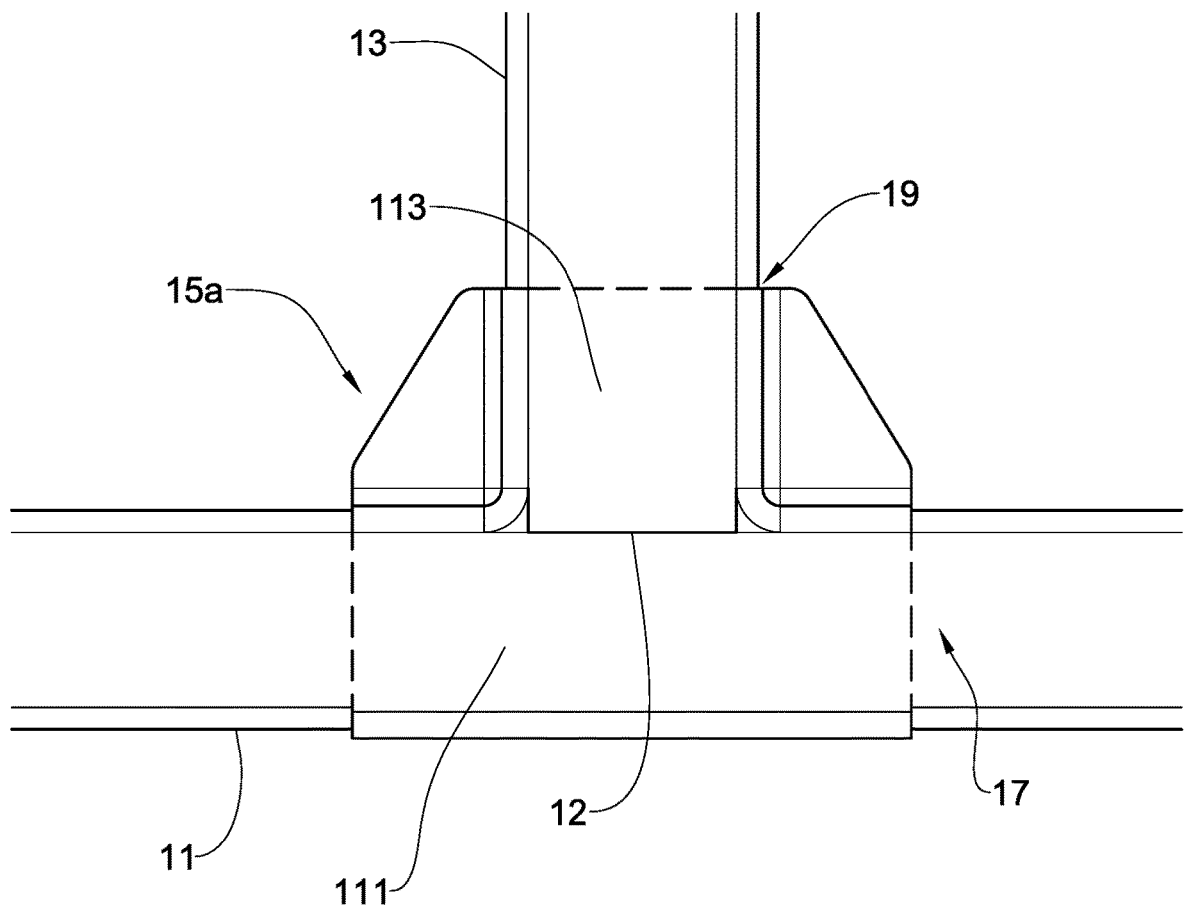
FIG. 2 is an enlarged plan view of one shell member of a node unit according to one example of the presently disclosed subject matter, with associated structural members received therein, before another shell member of the node unit has been fixed thereto for use in the BIW shown in FIG. 1.

In the illustrated example, as seen in FIG. 2, each beam 11,13 comprises engaging portions 111 and 113, while the node unit 15 comprises two designated sockets 17 and 19, each configured to snugly receive the respective engaging portion 111,113. As can be understood from FIG. 2, the engaging portion 111 constitutes a middle engaging portion as it is disposed between side portions 11a and 11b of the structural member 11. Suitably, as seen in FIG. 1, the corresponding socket 17 accommodating this engaging portion 111, constitutes an embracing socket as it has two opposed and aligned openings 17' and 17", which render it suitable for receiving therein the middle engaging portion 111 in a manner which allows the side portions of the beam 11 to protrude from the openings 17' and 17".

Figure 3A:
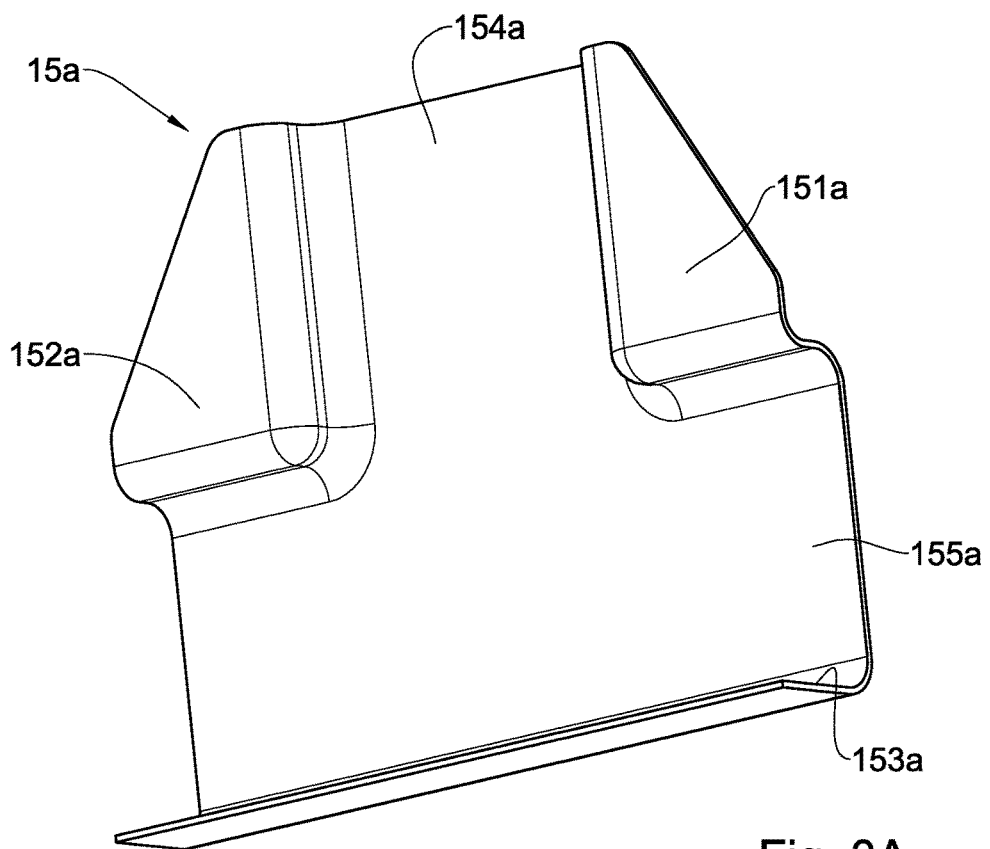
FIG. 3A is a perspective view of the interior of the shell member shown in FIG. 2.
Figure 3B:
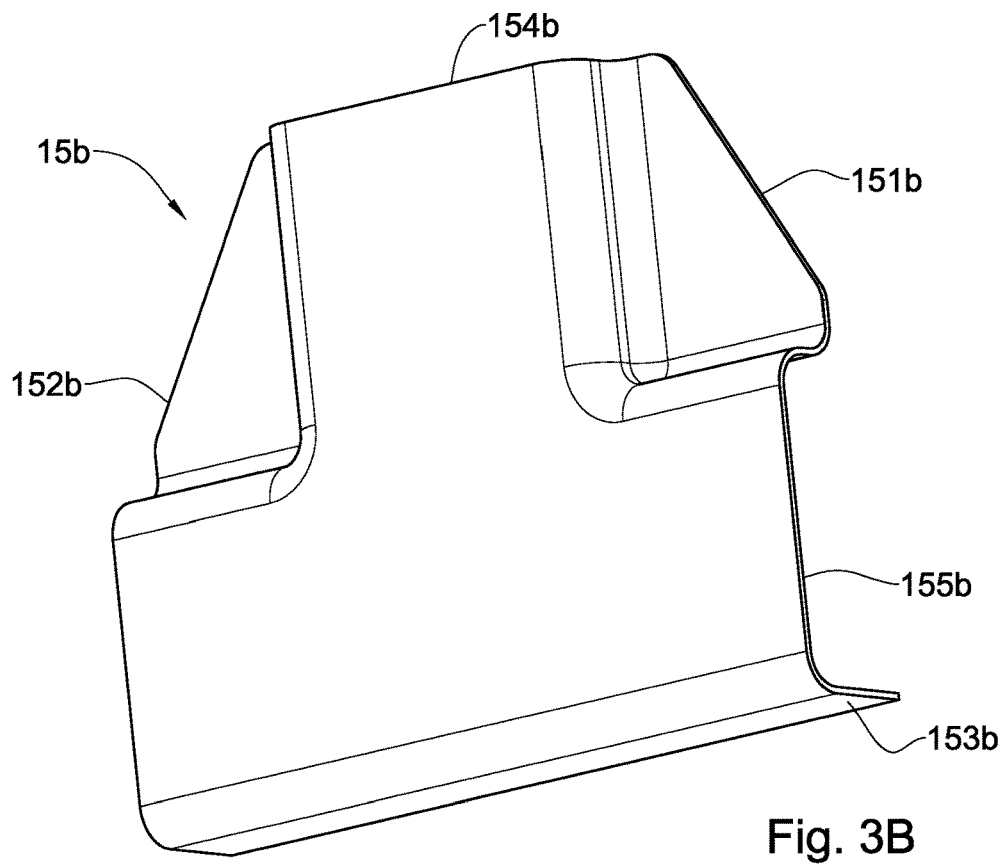
FIG. 3B is a perspective view of the interior of the other shell member configured to be fixed to the shell member shown in FIG. 2, to form a node unit.

The node unit 15 consists of two shell members 15a and 15b, shown separately from each other in FIGS. 3A and 3B, configured to be fastened to each other to form the node unit 15 with the designated sockets 17 and 19 thereof. Each shell member 15a,15b constitutes one half of the node unit 15, such that socket portions 154a and 154b form together the designated socket 19, while portions 155a and 155b form together the designated socket 17. These designated sockets are interior sockets formed between the two shell members 15a and 15b, as best seen in FIG. 4A with respect to the interior socket 17.

In other embodiments of the presently disclosed subject matter, at least one socket can be a non-interior, independent socket, formed in one of the shell members, and more than two shell members can be required for forming a single interior socket and thus a complete node unit.

Reverting to FIG. 2, the structural members 11 and 13 are initially positioned in one of the shell members, e.g. the member 15a such that their engaging portions 111 and 113 are oriented in 90 degrees with respect to each other, and the shell members 15b is then fastened to the shell member 15a, so as to fixedly secure the engaging portions 111, 113 in place.

As seen in FIGS. 3A and 3B, the shell members 15a and 15b comprise mating pairs of auxiliary flanges 151a and 151b, respectively. When the shell members 15a and 15b are assembled together to form the node unit 15, the mating pairs of the auxiliary flanges contact each other.

To fixedly secure the two shell members 15a and 15b to each other along the above pairs of flanges, and thereby the two engaging portions 111,113 within the designated sockets 17,19, any suitable fixation techniques can be used. One example of this is gluing the flanges to each other by an adhesive which can be applied at the contact areas thereof. In this example, the contact area between the auxiliary flanges of the two shell members constitutes a majority of the total contact area between the shell members, which allows applying a relatively large amount of adhesive thereon, so as to create a strong bond between the two shell members 15a and 15b.

In order to increase the integrity of the connection, the auxiliary flanges 151a, 151b can be pressed against each other after the application of the adhesive, and the adhesive can also be applied between portions 153a and 153b located on an inner surface of the shell member 15a, and on an outer surface of shell member 15b, respectively, as well as within the sockets 17 and 19.

The above manner of connection allows the beams 11 and 13 together with their engaging portions 111 and 113, to be made of any material including a composite material. The same is correct regarding the node 15, i.e. the shell members 15a and 15b, which in this example can be made of pressed aluminum sheet.

Whilst the shell members 15a and 15b described above are shown as being pre-formed to have their interior of the desired configuration, this does not need to be the case. Thus, for example, the shell members can be forced to receive the desired configuration by pressing a flat aluminum sheet against the corresponding structural members arranged in a desired disposition, at their intersection area, so that the corresponding interior sockets 17 and 19 are formed, conforming in shape to that of the engaging portions 111,113.

Regarding the mutual disposition of structural members with respect to each other and, consequently, of their engaging portions with the corresponding node unit, these portions can be in contact with each other within the node unit.

In example shown in FIG. 2, the engaging portions 111 and 113 of the respective beams 11 and 13 are received within the respective designated sockets 17 and 19 so that they contact each other at an interface area 12. In this case the interface 12 is a load bearing interface, allowing the load transfer between the beams 11 and 13 within the node unit 15. However, when such load transfer between two structural members connected by a node unit is not desired, the can be spaced from each other, e.g. by the body of the node unit.

Figure 5:
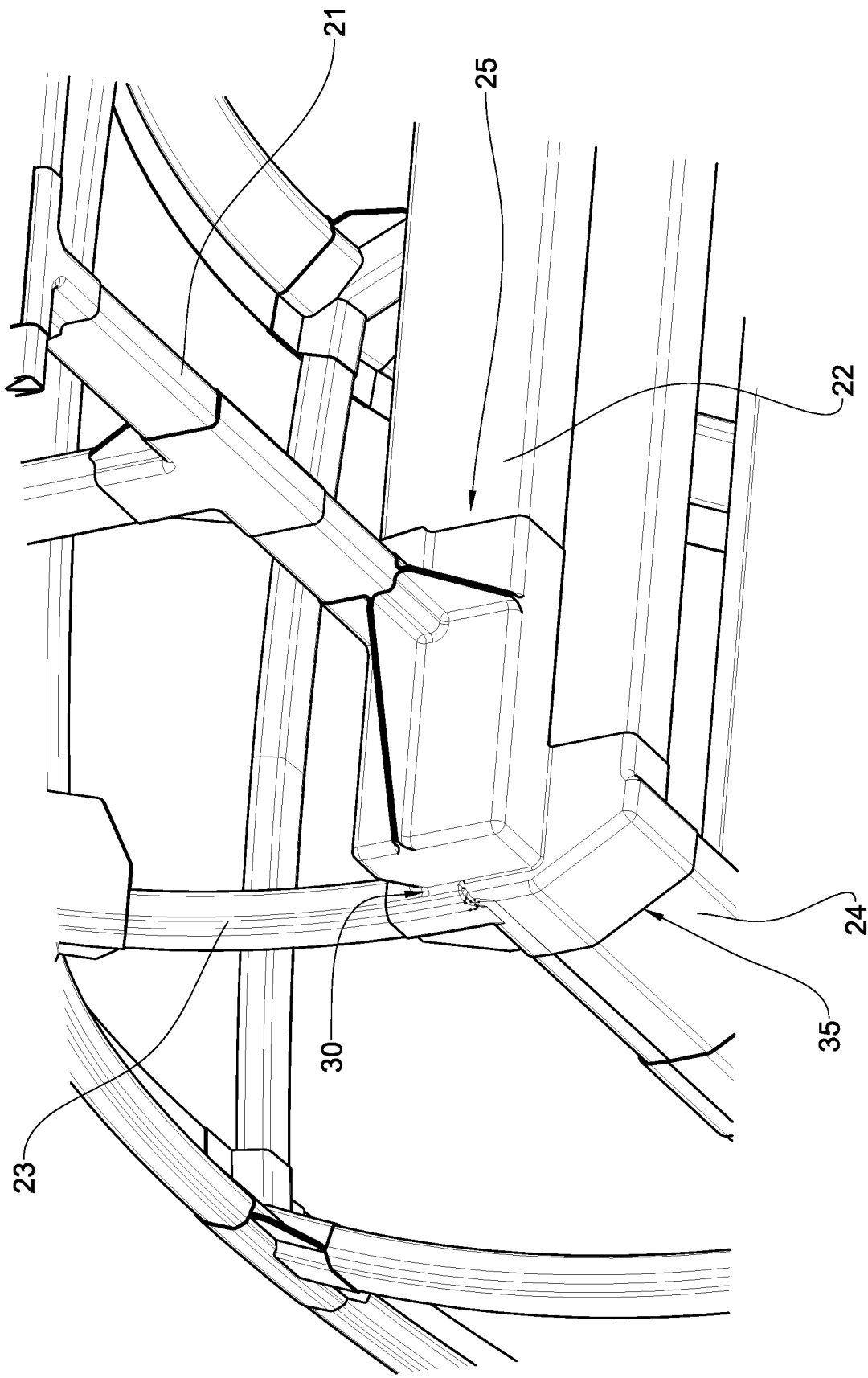
FIG. 5 is a perspective bottom view of one node unit attached with another node unit, according to a further example of the presently disclosed subject matter.

The description above exemplifies how two structural members can be adjoined, at a mutually perpendicular orientation, by a node unit assembled of two shell members. However, the number of structural members connected by a single node unit in accordance with the presently disclosed subject matter can be any desired and they can have any desired mutual orientation. One example this option is a 'star like' configuration wherein structural members extend radially from a common central area disposed within a node unit. Also, node units according to the presently disclosed subject matter can be assembled from any number of shell members and/or can be connected to each other to form a combined node structure. node unit One example of such combined node structure is shown in FIG. 5 illustrating two connected node units 25 and 35, the former configured to connect engaging portions of two beams 21 and 22 of the vehicle BIW shown in FIG. 1, and the latter configured to connect engaging portions of two beams 23 and 24. The connection between the two node units can be performed by welding or otherwise fixing them to each other at a zone 30.

Node units according to the presently disclosed subject matter can be connected or constitute a part of a component of a vehicle, which does not necessarily has to constitute a part of its BIW.

Figure 6:
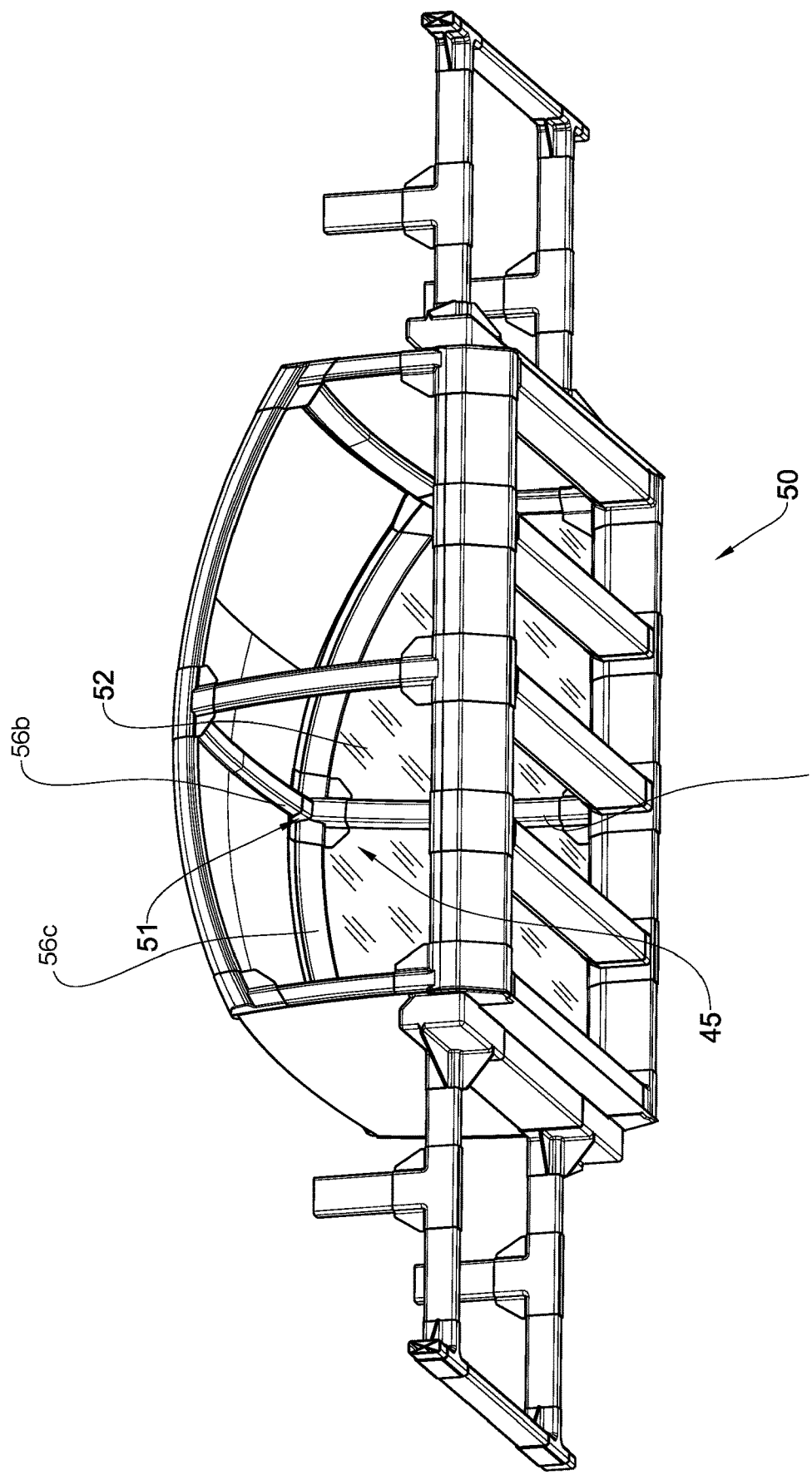
FIG. 6 is a perspective view of a BIW of a vehicle with a side wall of the vehicle constituting a shell member for a node unit of the BIW.

One example of such an option is shown in FIG. 6, which illustrates a BIW of a vehicle 50 together with a side wall 52 of the vehicle. The side wall 52 is integrally connected with a shell member [not seen], which is formed as a mate to shell member 51, in the node unit 45. The two shell members are configured to be fastened to each other over the structural members 56a, 56b and 56c, and thereby form the node unit 45.

Having a shell member integrally connected to the wall 52 of the vehicle, allows the vehicle BIW to be assembled in layers together with the wall 52. The first layer includes the wall 52 together with the node integral therewith [not seen], the second layer includes the structural members 56a, 56b and 56c, and the third layer includes the shell member 51. The layers can be assembled to each other, for example, by means of an adhesive being applied between at least some of their contact areas.

A node unit with its shell members according to the presently disclosed subject matter can have, in addition to at least one interior socket such as those described above, which is formed by the assembly of the shell members, at least one exterior socket constituting a part of one of the shell members independently of any other shell member. A structural member received within such exterior socket or at least its engaging portion can be made of a material different from that of which the structural members received in the interior sockets or at least their engaging portions can be made. For example, the latter material can be a metal or an allow and the latter can be a composite material.

Figure 7A:
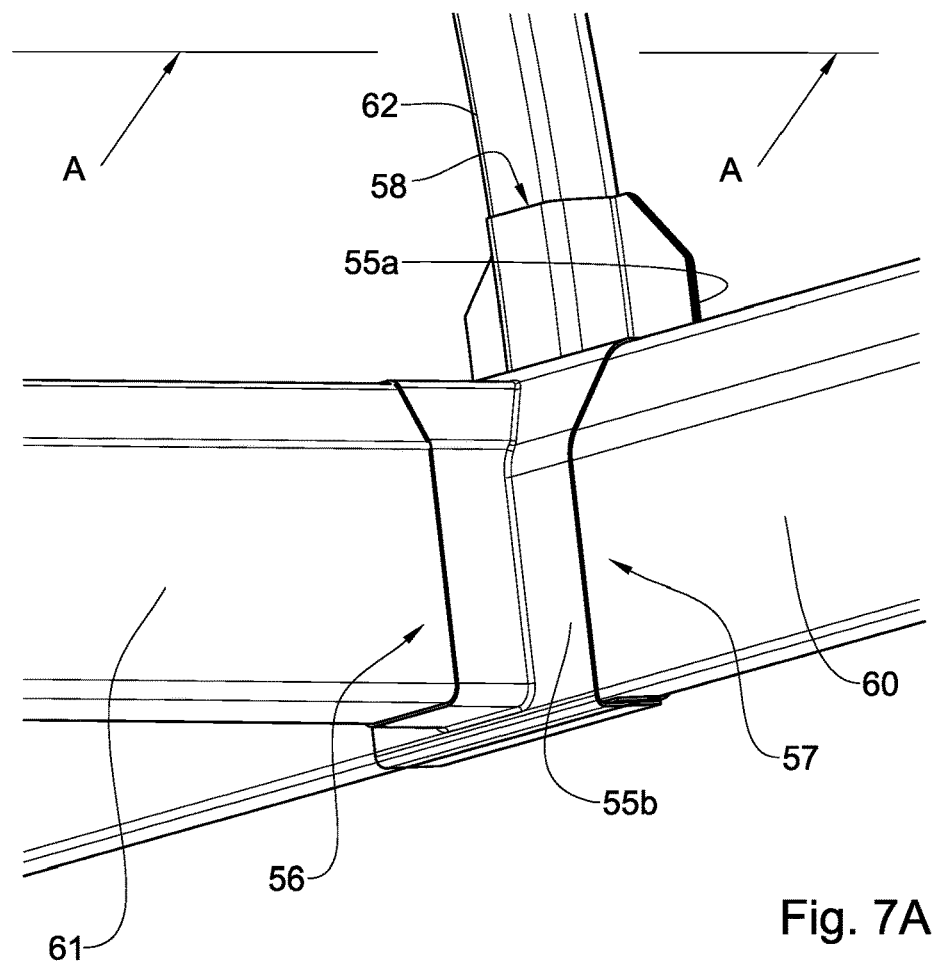
FIG. 7A is a perspective view of a node unit with an independent socket, according to a further example of the presently disclosed subject matter, shown with three structural members connected thereby.

FIG. 7A illustrates one example of such node unit 55 having two shell members 55a and 55b, and three designated sockets 56, 57, and 58, each snugly receiving an engaging portion of a beam 60, 61 and 62, respectively. The sockets 57 and 58 are interior sockets defined between the shell members 55a and 55b, whereas the socket 56 is an exterior, independent socket formed merely in the shell member 55a.

To assemble such connection of the beams 60, 61 and 62, the shell members 55a and 55b can firstly be assembled and fastened to each other over the engaging portions of the beams 60 and 62, so as to fixedly secure these beams within the interior sockets 57 and 58, while the beam 61 can be subsequently inserted into, and be fixed within, the socket 56.

Figure 7B:
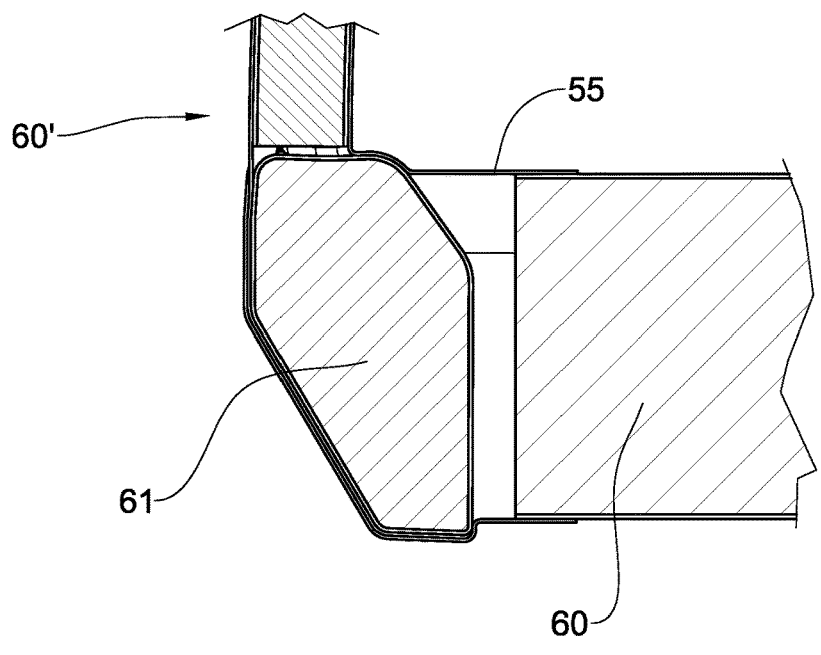
FIG. 7B is a cross section view of the node unit and structural members shown in FIG. 7A taken along the line A-A.

As seen in FIG. 7B the beam 62 is disposed along a vertical plane and appears to be leaning on the beam 61 via an interface 60', while the beam 61 is disposed on a horizontal plane and appears to be leaning merely on the body of the node unit 55. In this example, the node unit 55 should have such integrity which allows it to support the beam 61.

In the above structure, the beam 61 or at least its engaging portion can be made of metal, e.g. aluminum, while the beams 60 and 62 or at least their engaging portions can be made of composite material.

Figure 8:
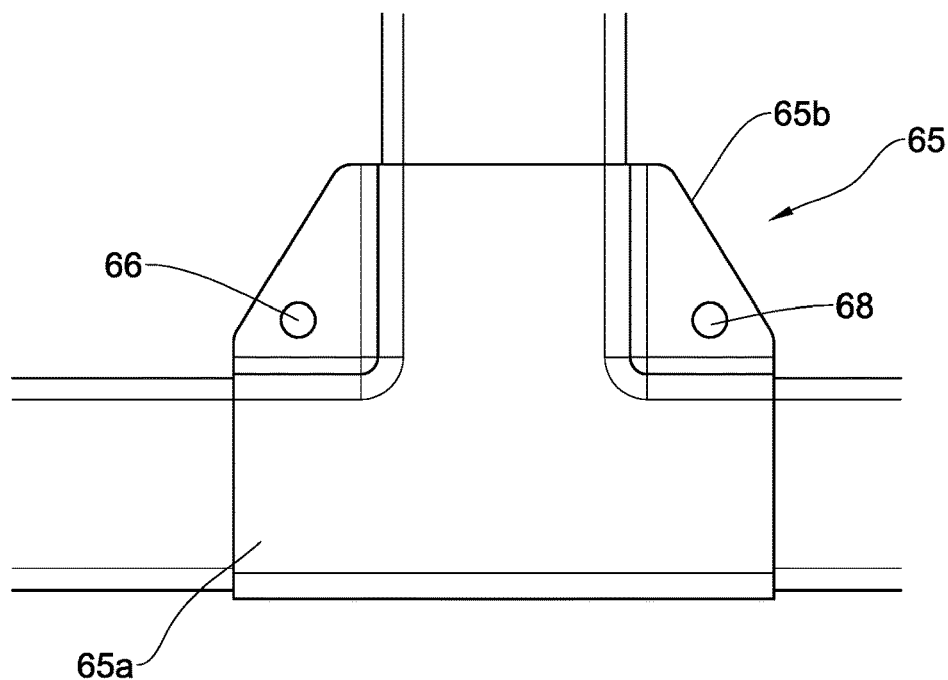
FIG. 8 is a plan view of a node unit comprising fasteners, according to a still further example of the presently disclosed subject matter.

Though as mentioned above, shell members of node units of the presently disclosed subject matter can be fixed to each together by an adhesive, other fastening techniques can be used as well, instead or in combination with an adhesive. One example of this option is shown in FIG. 8 which illustrates a node unit 65 assembled of two shell members 65a and 65b, fastened to each other by two fasteners 66 and 68, at their auxiliary flanges, fixedly securing them to each other.

It can also be appreciated that shell members according to the presently disclosed subject matter can be connected to each other at one side thereof prior to their being assembled to form a node unit. Such connection can be a result of the shell members being formed as a unitary body in which two shell members are constituted by two shell portions of the body connected at along a folding line.

Figure 9:
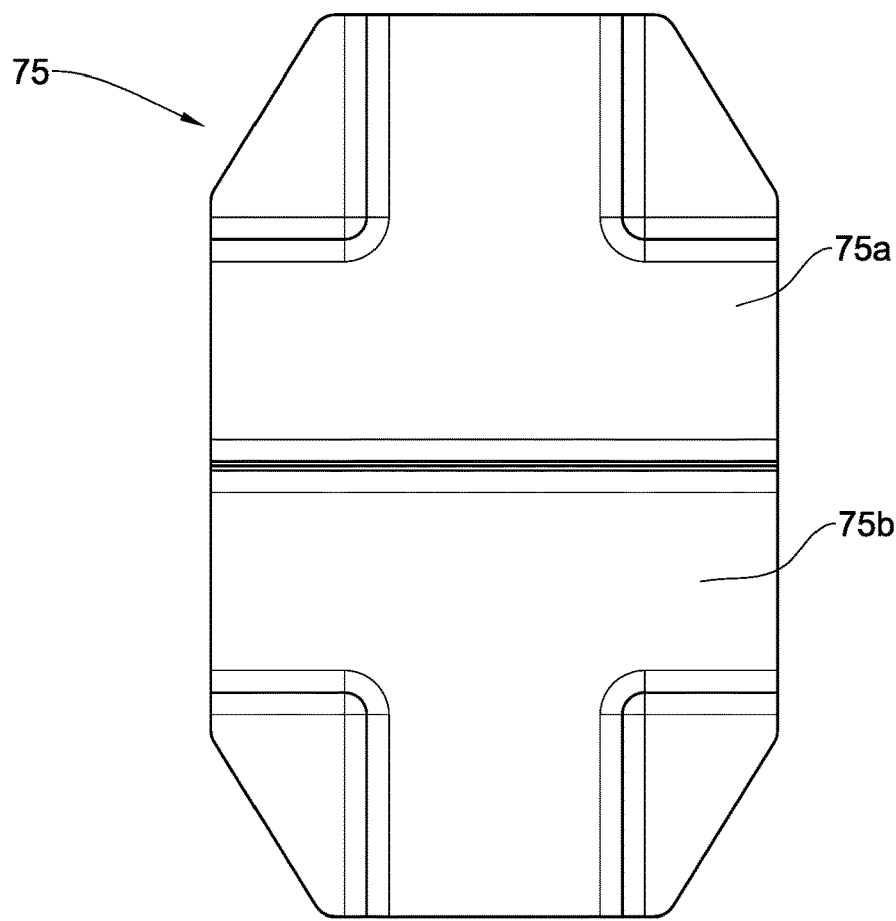
FIG. 9 is a plan view of a foldable node unit, according to a still further embodiment of the presently disclosed subject matter.

FIG. 9 shows one example of such option, in which a unitary node unit body 75 comprises two shell portions 75a and 75b connected along 75'. The node unit body 75 is shown in its unfolded state in FIG. 9. When folded, the shell portions 75a and 75b form designated sockets in a similar manner to that described above for the node unit 15.

The invention claimed is:

1. A vehicle, comprising:
    a body in white ("BIW") comprising two or more structural members having two or more respective engaging portions;
    wherein the two or more respective engaging portions of at least two of the two or more structural members being connected to each other by a node unit formed of two or more shell members assembled with each other, the node unit having at least two designated sockets, each of the at least two designated sockets snugly receiving one of the two or more respective engaging portions of one of the two or more structural members;
    wherein at least one of said at least two designated sockets is an interior socket formed between the two or more shell members, wherein one of the two or more shell members constitutes a part of a wall of the vehicle.

2. The vehicle of claim 1, wherein at least one engaging portion of the two or more respective engaging portions received within said interior socket is made of a composite material.

3. The vehicle of claim 2, wherein the two or more shell members are fastened to each other over the engaging portion made of a composite material.

4. The vehicle of claim 1, wherein two or more of the at least two designated sockets of the node unit are interior sockets defined between at least two of the two or more shell members, and the at least two of the two or more shell members are fastened to each other over the respective engaging portions.

5. The vehicle of claim 1, wherein the two or more structural members are beams or pillars of the BIW of the vehicle.

6. The vehicle of claim 1, wherein the two or more shell members are configured to be pressed at least against a respective engaging portion of at least one of the two or more structural members so that the interior socket is rendered a shape conforming to the shape of this respective engaging portion.

7. The vehicle of claim 1, wherein the engaging portion of at least one of the two or more structural members constitutes a middle engaging portion disposed between side portions of the structural member, and the corresponding socket constitutes an embracing socket receiving therein the middle engaging portion so that the side portions of the structural member protrude therefrom.

8. The vehicle of claim 7, wherein the embracing socket is the interior socket.

9. The vehicle of claim 1, wherein the two or more designated sockets are interior sockets formed between two or more of the two or more shell members.

10. The vehicle of claim 1, wherein the designated sockets have such mutual orientation that, when the engaging portions are received therewithin they have a load bearing interface between them.

11. The vehicle of claim 10, wherein the load bearing interface is a partition at least partially separating between the sockets.

12. The vehicle of claim 1, wherein the two or more shell members are configured to be fastened to one another by an adhesive.

13. A method for manufacturing a vehicle having a body in white ("BIW"), the method comprising:

providing two or more structural members having two or more respective engaging portions;

providing a node unit comprising two or more shell members, which when assembled with each other form the node unit, the node unit having at least two designated sockets each configured to snugly receive an engaging portion of the two or more respective engaging portions, wherein at least one of said at least two designated sockets is an interior socket formed between the two or more shell members, wherein one of the two or more shell members constitutes a part of a wall of the vehicle; and fastening at least two of the two or more shell members to each other over at least one engaging portion to fixedly secure at least that engaging portion within an interior socket of the node unit.

14. The method of claim 12, further comprising snugly inserting a second engaging portion to a second designated socket, and fastening this engaging portion therewithin.

15. The method of claim 12, wherein said fastening of the two or more shell members is performed by an adhesive.

* * * * *